May 18, 1965 J. ALBIN ETAL 3,184,718

INFORMATION HANDLING SYSTEMS

Filed April 8, 1957 2 Sheets-Sheet 1

Inventors
Jacques Albin
Alice M. Recoque
André M. Richard
By Ralph B. Stewart
attorney May 18, 1965 J. ALBIN ETAL 3,184,718

INFORMATION HANDLING SYSTEMS

Filed April 8, 1957 2 Sheets-Sheet 2

Inventors
Jacques Albin
Alice M. Recoque
André M. Richard
By Ralph B. Stewart
Attorney 3,184,718

INFORMATION HANDLING SYSTEMS

Jacques Albin, Chaville, Alice Maria Recoque, Sartrouville, and André Michel Richard, Paris, France, assignors to Societe d'Electronique et d'Automatisme, Courbevoie, France Filed Apr. 8, 1957, Ser. No. 651,203
Claims priority, application France, May 3, 1956, 713,805
9 Claims. (Cl. 340—174)

The present invention relates to magnetic core circuits for use in logical and functional networks for use mainly in computing systems operating upon digital electric codes expressed in the well-known binary system of numeration. In such circuits, the said cores are of a saturable kind and, for instance, may be made of ferromagnetic materials.

In order to suitably provide such magnetic core circuits, the two main logical functions of And-operation and Or-operation are mainly to be considered. It is known that from such a pair of logical functions, any logical operation of more complex character may be made, especially when each information therefor is available both in the direct and complement representations thereof. And-operation is the logical operation effecting the logical product of a plurality of binary informations. Or-operation is the logical operation effecting the logical summation of a plurality of binary informations. An And-circuit or network receives a plurality of signals of distinct informations and delivers at the output thereof a signal of a determined presentation each time a determined combination of the values is met in the whole of these input signals. An Or-circuit or network receives a plurality of signals of distinct informations and delivers at the output thereof a signal of a determined presentation each time a specific condition is met in one at least of the said plurality of input signals.

In binary coded information handling systems, each digit or "bit" of information can only have the one or the other of two values, namely zero and one, respectively corresponding to the two terms of a logical alternative. At any definite time instant within such a system, a signal representing an information digit or bit can only be of one of these values, for instance of a higher or lower voltage or current value, and so forth. The waveform of the said signals consequently varies with the time in a rectangular manner the faster changes of levels therein making the better definition thereof.

It has been found of advantage to employ temporary storage of such signals to enable performance of logical operations thereon and the transfer of the resulting signals to further networks in an information handling system. Such temporary storage enables definite markings of the timings and locations of the successive information bits as also the correction, if any is required, of the timing of the information bits with respect to the overall timing of the system. Magnetic cores are well known for such temporary storage. Each magnetic core is provided with at least one pair of windings. One of the said windings is adapted to receive a "logical" signal, direct current or pulse current, which for one of the values thereof brings the magnetic core to a predetermined magnetization state most often a magnetic saturation condition. For the other value thereof, the said signal brings the core to another magnetization state, most often either the non-saturated condition or the saturated condition of opposite polarity. It is of common practice to use magnetic cores having a substantially rectangular hysteresis characteristic for this purpose whereby the digital value 1 is considered as recorded on the cores when the magnetic material thereof presents a positive remanent induction, and the digital value 0 when the said material presents a negative remanent induction or conversely. The reading-out of information bits is stored in this manner then effected by applying an electrical current of a certain direction to a second winding so that the action of such current opposes the saturation condition of the core representing one of the digital values 1 for instance. Such a reading-out process destroys the information bit previously recorded on the core concerned.

Another manner of handling information stored on magnetic cores employs the change of impedance which exists across a winding of a core according to whether the core is saturated or not. When the core is saturated, the impedance of the winding is of course quite small with respect to the value thereof when the core is in a non saturated condition. The read-out windings of a plurality of magnetic cores maybe serially connected with a write-in winding of a single magnetic receiving core; the said receiving core is provided with a reset winding which is energised prior to those serially connected windings in order to set the magnetization thereof in a predetermined condition, and then a current is applied to the serially connected windings: when all the magnetic cores of the said serial connection are in the same predetermined condition, the reading current passes through an electrical circuit of lower impedance and thereby is applied with the higher intensity to the write-in winding of the said receiving core to bring this core to a magnetization condition opposite to the one to which it has been reset; if and when, on the other hand, one at least of the said cores is in a non-saturated condition, the current flowing therethrough is brought to its lower value whereby the receiving core remains in the reset condition. In both cases, the said receiving core is thereafter "read" to obtain the result of such an operation and transfer the result to at least one further logical network of the processing system.

Reference will now be made to the accompanying drawings wherein:

FIG. 1 shows a first embodiment of a logical network according to the invention;

FIGS. 2, 3 and 4, respectively show embodiments of a transfer network which may be used with the logical network of FIG. 1;

Figure 1:
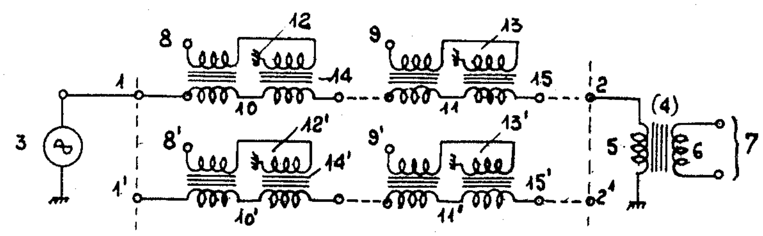
Figure 6:
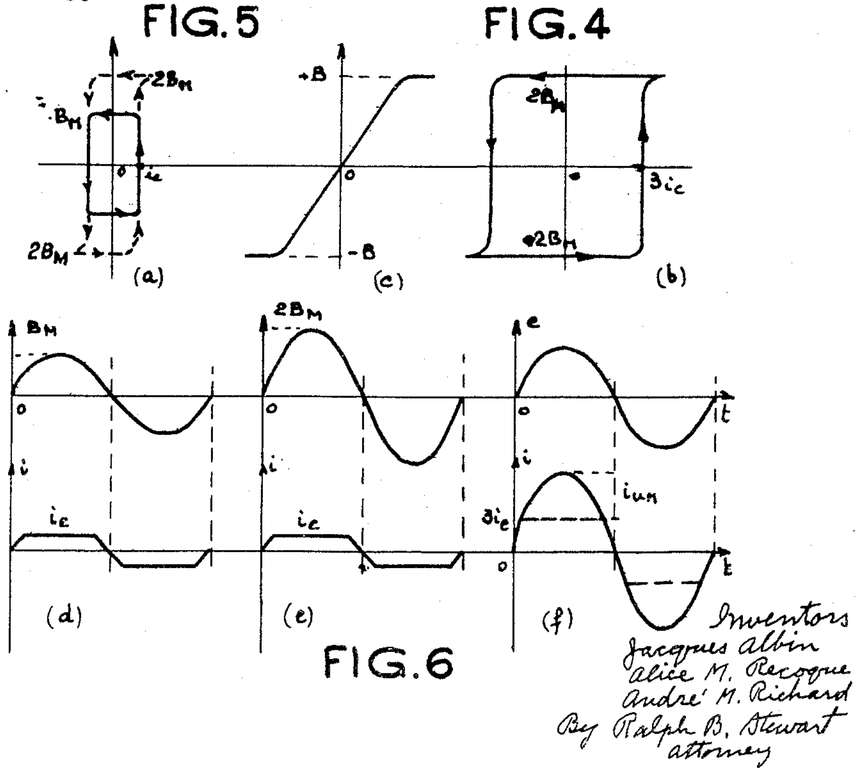
FIG. 6 shows various graphs used for explaining the operation of the network of FIG. 1.

Referring to FIG. 1, the network shown therein comprises first, between two terminals 1 and 2, a series connection including two read-out windings 10 and 11 of two separate magnetic cores 14 and 15. The terminal 1 receives the current from an A.C. source 3, the terminal 2 is connected to the primary winding of an output transformer (4), the secondary winding of which is shown at 6. It is at the output terminals 7 of the said secondary winding 6 that a transfer network such as shown in FIG. 2, or FIG. 3 or FIG. 4 or FIG. 7 will be connected in order to complete a circuit according to the invention. The windings 5 and 6 may be considered, in the network of FIG. 1, as comprising the same number of turns. The magnetic core of the transformer (4) is made of a material having a substantially rectangular hysteresis characteristic, which is relatively wide, see FIG. 6(*b*), whereas each one of the magnetic cores 14 and 15 are made of a material having a narrower hysteresis characteristic, as shown at FIG. 6(*a*).

Figure 5:
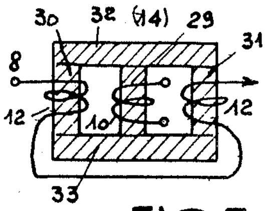
FIG. 5 shows an example of embodiment of a "logical" magnetic core for the network of FIG. 1.

The magnetic core 14 is provided with a control winding 12 and the magnetic core 15 is provided with a control winding 13. The control D.C. or rectified current for the winding 12 is applied at the terminal 8 and the control D.C. or rectified current for the winding 13 is applied at the terminal 9. Each control winding is shown as comprising two parts in series opposition in order to avoid any effect of alternating current voltage induced in these windings. Such an arrangement, with the core structure shown at FIG. 5 is not necessary in such an embodiment as the one shown in FIG. 7 for reasons which will be apparent from the disclosure of operation of the said FIG. 7. In FIG. 5 and in FIG. 1, each core such as 14 and 15 is made with three legs the inner leg 29 being of a ferromagnetic material, which is not imperative for the outer legs 30 and 31. The A.C. winding is provided around the inner leg 29 and the outer legs are provided with one-half of the control winding as shown. The magnetic circuit is closed by a pair of armature members 32 and 33.

In the network of FIG. 1, a second branch similar to the above described one, may be connected across another pair of terminals $1^1$ and $2^1$ of the A.C. source and of the primary winding 5, respectively. The two-branch network then acts as a circuit effecting the combining of two And-operations, each And-operation circuit passing through one of the branches of the network, and the combining of the signals being performed by the primary winding 5 of the output transformer (4).

Neglecting as usual technological factors such as the losses within the cores and the intrinsic resistances of the windings, the operation of the network of FIG. 1 may be explained as follows:

The voltage of the source 3 is denoted E and this voltage is equally divided between the windings in series in each branch of the network when the magnetic cores thereof are not in a saturated condition. For instance, if the magnetic cores 14 and 15 do not receive any control current and consequently are not saturated at a definite instant of time, each one of the said cores will be driven by the said alternating current through a cycle such as shown in full line in the graph (*a*) of FIG. 6, this cycle being traversed within a complete period of the alternating current, see curve (*d*) of the same FIG. 6. Such a cyclic variation occurs between two values of magnetic induction, $+B_M$ and $-B_M$. The current passing through each one of the series connected windings has a constant value $i_c$, see curve (*d*) of FIG. 6, solely determined by the said cyclical variation of flux within the material of the core. As the impedance value of the said windings is high, the value $i_c$ of the currents is low.

Considering now that in the other branch, the core $15^1$ is saturated from the application on the control winding thereof of a control current. The winding $11^1$ of the core will present a quite low impedance to the electrical current passing therethrough and actually it may be considered that there exists a straight-through connection across the terminals of such a winding. The voltage E will be fully applied to the winding $10^1$ and the magnetic core $14^1$ will be driven into a cyclical variation of induction such as shown by the dotted-line cycle in the graph (*a*) of FIG. 6, between the values $+2B_M$ and $-2B_M$, see also the upper curve of the graph (*c*) of the said FIG. 6. The current through the branch concerned will be determined by the said variation of magnetic flux and, for all identical conditions, will also be equal to $i_c$, see the lower curve of the graph (*e*) in FIG. 6. The combining of the two currents, each of a value $i_c$, in the primary winding of the transformer (4), will result in a current equal to $2i_c$ through the said winding 5. It may be checked that for any other condition of the network than those wherein both the magnetic cores of one branch are saturated, the combined current through the primary winding 5 will always be of a constant value equal to $2i_c$. The magnetic core of the transformer (4) presents, as said, a wide hysteresis cycle which can only be traversed if the current in the primary winding is at least equal to $3i_c$. Consequently, the application thereto of a primary current equal to $2i_c$ will not have any action as regards to the magnetic condition of the transformer core; the primary winding 5 in such a condition appears as a practical short-circuit between point 2 and earth as the resistance of the said winding is quite low in itself.

When on the other hand the two magnetic cores in one of the branches of the network are both in a saturated condition, for instance the cores 14 and 15, the full voltage value E is applied across the primary winding 5 of the output transformer (4). This winding is thus submitted to an electrical current of a value equal to $2i_c+i_u$ from the one branch and also to an electrical current of a value equal to $i_c$ from the other branch of the network wherein one at least of the magnetic core is not saturated. In such conditions, the primary winding 5 receives an electrical current of a value equal to $3i_c+i_u$, see lower curve of the graph (*f*) of FIG. 6 and the hysteresis cycle of the core of the output transformer (4) is traversed as shown in the graph (*b*) of FIG. 6 during each period of the alternating current, between the values $+2B_M$ and $-2B_M$ for instance. The transformer (4) having a transformation ratio equal to 1/1, this current will be transmitted to the secondary winding thereof.

When both branches of the network have their magnetic cores in saturated condition, the result will be the same as for the saturation of the cores of a single branch for a suitable dimensioning of the transformer (4).

It is now apparent from the above that a logical network in a system according to the invention may be made for ensuring only Or-operation of several informations or only an And-operation of several informations, when required, an And-operation network comprising a plurality of branches each one including a single magnetic core member and an And-operation network including a single branch comprising in series relation a plurality of read-out windings of as many magnetic cores.

Now, each one of the control windings such as 12 and 13 in an embodiment of the invention as above described possesses a substantial self-inductance which opposes instantaneous establishment of the saturation state in the magnetic core thereof. Thus, a delay will occur between the instant of application of a control current and the actual instant at which the core will be saturated. This means that each control signal (of unidirectional current as said) must last some number of periods of the alternating read-out current since apparently it is the said alternating current which produces the generation of any one of the said control currents in the handling system. This may or not be considered as a drawback and, when so considered, another arrangement will be made with respect to FIG. 7 of the accompanying drawings.

Figure 2:
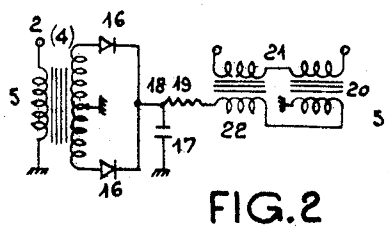

A transfer network is coupled to each one of the logical networks and, for such a kind of logical network as herein above described, a plain embodiment of such a transfer network is shown in FIG. 2. The secondary winding 6 of the output transformer (4) of a logical network is grounded from a mid-point thereof and the ends thereof are respectively connected to half-wave rectifiers 16 so that the current in the said winding 6 will be subjected to full-wave rectification. This current passes through a series resistance 19 and at least one control winding 22 of a further magnetic core 20 making part of a logical network of the system, either a further logical network or even the same logical network from which the signal issues for storage purposes for instance. The read-out winding of the core 20 is shown at 21. The rectified current also charges a condenser 17 and it is the charge of this condenesr which, through the well-known mechanism of voltage step accumulation, will build the D.C. voltage necessary for the saturation of the said magnetic core 20. The operation of such a network is then apparent.

Figure 3:
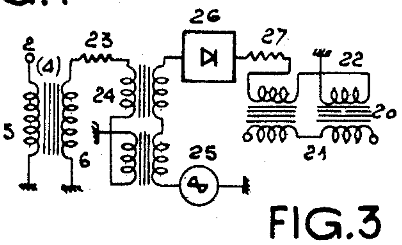

An alternative transfer network is shown in FIG. 3, wherein the secondary winding 6 of the output transformer (4) is series connected through a resistance 23 to the primary winding of a magnetic amplifier 24 of a well-known series kind with A.C. control input. The secondary winding of the magnetic amplifier 24 receives the A.C. voltage of a source 25 for rectification at 26 and the rectified current therefrom feeds a load circuit which includes a series resistance 27 and at least one control winding 22 of a magnetic core 20 to read-out winding 21 of which is inserted into a logical network of the system. The source 25 may be identified with the source 3 of the logical network of FIG. 1. When the magnetic cores of the magnetic amplifier 24 are made of a so-called remanator material, the response of the amplifier, in other words the switching on and off thereof is faster than one period of the alternating current; in this lies the advantage with respect to the arrangement of FIG. 2 wherein several pulse periods are necessary for building up the control voltage in the transfer network.

Figure 4:
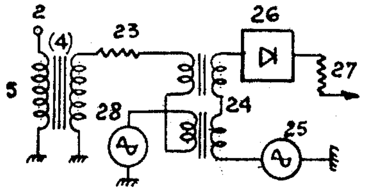

A transfer network including a magnetic amplifier may be used, when required, for transferring the output signal from a logical network to one or several logical networks of the system not in the direct form thereof but in the complement form. As shown in FIG. 4, the primary winding of the magnetic amplifier will then be fed from an A.C. source 28 of the same frequency as the source 3 of the logical network but of such a relative phase therewith that when the output winding 6 of the transformer (4) receives a current from the primary winding 5, the current of the said winding 6 and the current of the said source 28 are of opposite directions and substantially cancel in the primary winding of the magnetic amplifier 24. A rectified output from the said magnetic amplifier then exists when the secondary winding 6 is not activated from the logical network and disappears when the secondary winding is activated therefrom. It is further apparent that both arrangements of FIGS. 3 and 4 may be connected in parallel at the output of a single logical network whereby any information signal will be available in both direct and complement forms when required.

Figure 8:
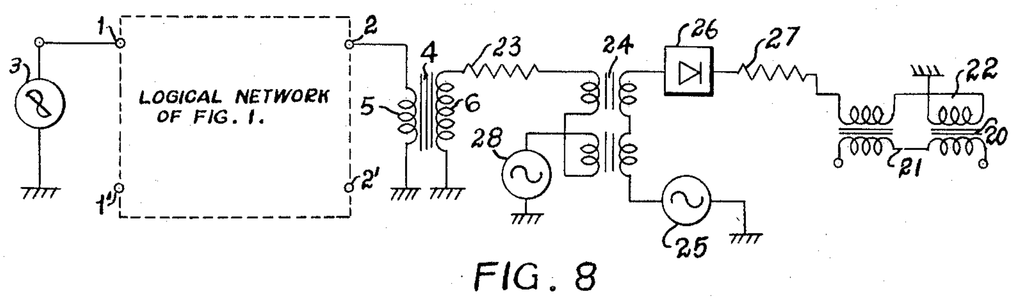
FIG. 8 shows in a single figure the logical network of FIG. 1 associated with the transfer network of FIG. 4 and the termination of FIG. 3.

In FIG. 8 is shown the modification of FIG. 4 incorporated in FIG. 1 and with the termination of FIG. 3.

Whereas the hysteresis characteristic of the magnetic cores effecting logical combinations in the network of FIG. 1, such as the cores 14 and 15, has been considered as a substantially rectangular one, a quite similar arrangement is the one wherein each one of such cores presents an induction/current characteristic of the kind of that shown at (*c*) in FIG. 6. The sole difference in the operation of the circuit is that the currents of the $i_c$ kind then have sinusoidal variations when the source 3 is sinusoidal. It may be noted that the alternating electromotive force is not imperatively sinusoidal and may be for instance of a rectangular or symmetrical saw-tooth waveform.

It is further advantageous to provide a transfer and a read-out of a logical result within a single period of the alternating current in order to speed up the operation of the circuits. According to a further embodiment of the invention, such an advantage is achieved with an arrangement such as the one shown in FIG. 7. In this arrangement each control current consists of a rectified half-wave of a sinusoidal oscillation, from source 43 which is in phase opposition with respect to the source 3 of the logical network, the control windings being inserted in series relation with the source 43, the output winding of the transformer (4), a rectifier 44 and a series resistor 45. In the example shown, such control windings are shown at 46, 47 and 48 which implies that three logical networks are to be fed with the resulting signal from the logical network which is shown therein. Any one of the control windings 12, 13 . . . of the logical network may be inserted into such a transfer network from another logical network of the system.

The "logical" magnetic cores such as 14 and 15 are each of a substantially rectangular hysteresis characteristic narrower in suitable ratio than that of the output transformer (4) of the network, as previously described. No special shape is required for the logical magnetic cores which may consist of toroids, as well known per se. The control winding 12 and 13 thereof are wound with a number of turns several times lower than the number of turns of their read-out windings for instance by a ratio of 1/3.

When a control winding of one of the said cores 14, 15 . . . receives a unidirectional current which brings the magnetic material of the core up to its saturation point, the read-out winding presents a low impedance value to the alternating current applied thereto, whereas such impedance is of a much higher value when the core is not saturated. Those terms of "higher" and "lower" values must be understood with reference to the impedance of the source 3 and with respect to the current values then developed into the primary winding 5 of the output transformer (4). The current passing through the said winding 5 must be such that it does not reach or exceed the value of the coercive current necessary for a change in the magnetic condition of the core of the said transformer (4). When, however, all the cores in one of the branches 1–2, 1′–2′ . . . or all the cores in several of such branches of logical network are in the saturated condition, the current passing through the winding 5 will exceed the value of the coercive current of the core of the transformer. Consequently the magnetic core (4) must be so chosen that the coercive current value conditioning the change of magnetic state thereof is higher than the sum of the components of current brought from the various branches of the network when one core at least is not saturated in each one of the said branches, and lower than the current brought to the primary winding 5 when all the cores in one of the said branches are saturated.

Figure 7:
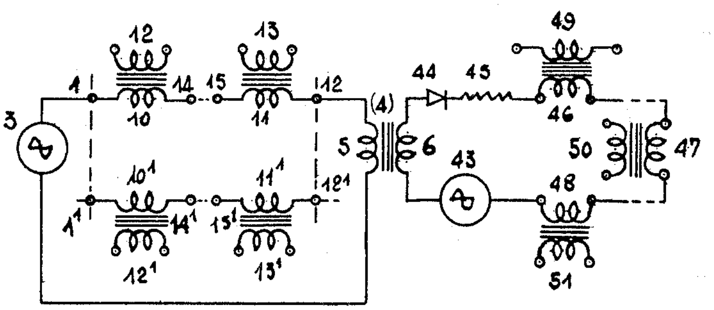
FIG. 7 shows a further embodiment of a combination of logical and transfer network according to the invention.

Referring to the transfer network shown in FIG. 7, the impedance of the source 43 must be low. The resistance 45 is intended to ensure a limitation of the current value in the series circuit wherein it is inserted, when required. The ratio of the respective amplitudes of the voltages from 3 and 43 determines, at least in rough approximation, the ratio of the number of turns to be established between the windings 5 and 6 of the output transformer. For an identical amplitude of these voltages, for instance, the ratio between 5 and 6 may be 1/1.

The operation of the device of FIG. 7 may be explained as follows: When control signals are applied to the magnetic cores of one branch of the network, which cores are saturated during one alternation of the source 3, the current passing through the primary winding 5 of the output transformer produces a change of magnetic condition of the magnetic core thereof. During the following alternation, the current of the source 43 will reset this magnetic core to the original magnetic condition. When no branch in the logical network has been saturated, the current passing through the primary winding 5 during an identical period of the source 3 does not change the state of the magnetic core of the output transformer and the following alternation of the source 43 leaves this magnetic condition unchanged. However, in the first of the two concerned alternations, the source 43 will saturate the magnetic cores of the logical networks fed from the transfer network. When the magnetic core of the transformer (4) is reset by the second concerned alternation from 43, the receiving magnetic cores are desaturated, but when the magnetic core of the output transformer is not reset, as not having been actuated in the said first alternation, the cores during the second concerned alternation of the source 43 are maintained in their respective saturation conditions. Simultaneously, all the cores such as 14, 15 . . . of the logical network the magnetic flux of which has varied in the next preceding alternation are reset from the current of the source 3. Consequently the read-out of a resultant signal from a logical network and the transfer thereof to the next logical networks are made within a single period of the alternating current. A transfer between successive logical networks in such a system always applies the signal resulting in the complement form with respect to the form under which the said signal issues from the logical network. This will not usually be a drawback but, if so considered, an additional arrangement may be provided for transferring the information in its direct representation from any logical network to any other one. This arrangement is the same as the one described with reference to FIG. 4: the saturation of any "receiver" core is effected only when no opposition exists between the current from a further A.C. source and the current from the source 43 through the rectifier 44; a reversal of the operative conditions such as above described is quite obvious.

What is claimed is:

1. A binary data processing system making use of temporary registrations of the information bits therein on saturable magnetic cores for processing therebetween according to logical operations, comprising, a saturable magnetic core circuit for effecting each of the logical processing operations, and a transfer network for collecting the resulting signal from each magnetic core circuit and transferring it to a data processing system including at least one further saturable magnetic core circuit, each of the magnetic core circuits for effecting the logical processing operations including a pair of saturable magnetic cores and at least one read-out winding on each core, the said read-out windings of the cores being connected in series between an alternating current source and the primary winding of an output transformer having a saturable magnetic core, said pair of magnetic cores each having a control winding thereon for receiving a unidirectional current and being saturable at a lower value of coercive current than the core of said transformer, and each one of the said transfer networks including a secondary winding of the said output transformer, a unidirectional current circuit controlled from the magnetic condition of the core of the said transformer, and including at least one control winding of a magnetic core forming a part of a logical network of the system and through which passes the said unidirectional current from the said circuit of the transfer network.

2. A binary data processing system making use of temporary registrations of the information bits thereon on saturable magnetic cores for processing therebetween according to logical operations, said system comprising alternate logical and transfer networks, each transfer network including at least one control winding of a logical network core and each logical network terminated by the primary winding of a transformer having a saturable magnetic core of a substantially rectangular hysteresis loop of high coercive current with respect to that of any one core of the logical network, the secondary winding of the said transformer acting as an input winding for the following transfer network, such that the transformer acts as a recorder member of the result of the logical network it terminates and reproduces said result in said following transfer network.

3. A binary data processing system according to claim 2 in which a plurality of saturable magnetic core circuit branches for effecting the logical processing operations is provided, the series connected read-out windings of the branches being connected in parallel between an alternating current source and the primary winding of the output transformer of the logical network, such that upon excitation of the control windings of the cores in some of the branches to saturate these cores, said branches will be effective to provide a read-out information signal operative on the output transformer core.

4. A binary data processing system according to claim 2 wherein each control winding of the logical circuit magnetic core is distributed in two equal and oppositely wound portions on two outer legs of the said core, an inner leg of which bears the read-out winding thereof.

5. A binary data processing system according to claim 4 wherein each of said transfer network includes a full-wave rectifier of the secondary current from the logical circuit to which it is connected and at least one input winding of the next following logical circuit and a condenser charged by the said rectified current and developing the required potential across the said input winding.

6. A binary data processing system according to claim 2 wherein the circuit in said transfer network includes an alternating current controlled D.C. output magnetic amplifier, the input of which is connected to the secondary winding of the said transformer and the output of which is serially connected to at least one control winding of a magnetic core coupled to a further logical network.

7. A binary data processing system according to claim 6 wherein the alternating current source is connected in the input circuit of the said magnetic amplifier in opposition to the current which may flow through the said secondary winding.

8. A binary data processing system according to claim 2 wherein the current in the transfer network is a unidirectional current derived from an alternating current by means of the unidirectional element serially connected in a circuit with a second source of alternating current and at least one control winding of the magnetic core of the logical network coupled to the transfer network.

9. A binary data processing system according to claim 8 wherein the phases of the alternating current sources in the logical and transfer networks thereof are in relative opposition.

References Cited by the Examiner

UNITED STATES PATENTS

| | | | |
|---|---|---|---|
| 2,741,758 | 4/56 | Cray | 340—174 |
| 2,822,532 | 2/58 | Thompson | 307—88 |
| 2,948,818 | 8/60 | Goto | 307—88 |
| 2,948,844 | 8/60 | Morgan | 330—8 |
| 3,011,706 | 12/61 | Goto | 307—88 |

IRVING L. SRAGOW, *Primary Examiner.*

EVERETT R. REYNOLDS, JOHN T. BURNS, *Examiners.*